(12) United States Patent
Miller et al.

(10) Patent No.: US 12,434,471 B2
(45) Date of Patent: Oct. 7, 2025

(54) PRINT DEFECT SEEDING WITHIN SELECTED ZONES FOR PRINT VERIFICATION SYSTEM

(71) Applicants: Phillip Eugene Miller, Boulder, CO (US); Carl Michael Dennison, Firestone, CO (US)

(72) Inventors: Phillip Eugene Miller, Boulder, CO (US); Carl Michael Dennison, Firestone, CO (US)

(73) Assignee: Ricoh Company, Ltd., Tokyo (JP)

( * ) Notice: Subject to any disclaimer, the term of this patent is extended or adjusted under 35 U.S.C. 154(b) by 942 days.

(21) Appl. No.: 17/552,669

(22) Filed: Dec. 16, 2021

(65) Prior Publication Data

US 2023/0191773 A1 Jun. 22, 2023

(51) Int. Cl.
  *B41F 33/00* (2006.01)
  *B41J 2/21* (2006.01)
  *B41J 29/393* (2006.01)

(52) U.S. Cl.
  CPC ......... *B41F 33/0036* (2013.01); *B41J 2/2135* (2013.01); *B41J 29/393* (2013.01)

(58) Field of Classification Search
  None
  See application file for complete search history.

(56) References Cited

U.S. PATENT DOCUMENTS

| | | | |
|---|---|---|---|
| 6,504,625 B1* | 1/2003 | Amero | B41J 2/2135 |
| | | | 382/163 |
| 6,526,240 B1* | 2/2003 | Thomas | H04N 1/00031 |
| | | | 399/72 |
| 8,472,073 B2 | 6/2013 | Dennison | |
| 8,611,613 B2* | 12/2013 | Rauscher | B41F 33/0036 |
| | | | 382/112 |
| 9,194,746 B1* | 11/2015 | Reda | G01J 3/50 |
| 9,507,547 B1* | 11/2016 | Dennison | G06K 15/1809 |
| 11,245,808 B1* | 2/2022 | Osada | H04N 1/00679 |
| 11,341,382 B1* | 5/2022 | Miller, II | H04N 1/00034 |
| 2006/0238780 A1* | 10/2006 | Dennison | G06K 17/00 |
| | | | 358/1.9 |
| 2006/0274370 A1* | 12/2006 | Shima | G06K 15/02 |
| | | | 358/1.15 |
| 2007/0165248 A1* | 7/2007 | Utsunomiya | G06F 3/1208 |
| | | | 358/1.1 |

(Continued)

OTHER PUBLICATIONS

Videk; DocuVision Pro Web Inspection System; 2020.

*Primary Examiner* — Akwasi M Sarpong
*Assistant Examiner* — Pawan Dhingra
(74) *Attorney, Agent, or Firm* — Duft & Bornsen, PC

(57) ABSTRACT

Systems and methods are provided for seeding print defects and inspecting print jobs. One embodiment is a system that includes a print server. The print server includes an interface that receives a test print job, a memory that stores the test print job, and a print controller that determines a number of copies of the test print job to print, subdivides each sheetside image of the test print job into a number of distinct zones corresponding to the number of copies, assigns each of the zones to a different copy of the test print job, and for each copy of the test print job, and seeds a print defect into each sheetside image of the copy within a zone assigned to the copy.

20 Claims, 7 Drawing Sheets

(56) References Cited

U.S. PATENT DOCUMENTS

| | | | |
|---|---|---|---|
| 2011/0141491 A1* | 6/2011 | Kuo | H04N 1/00034 |
| | | | 358/1.9 |
| 2016/0034228 A1* | 2/2016 | Kaneko | G06F 3/1204 |
| | | | 358/1.14 |
| 2018/0224784 A1* | 8/2018 | Katada | G03G 15/50 |
| 2020/0125307 A1* | 4/2020 | Kitayama | H04N 1/00015 |
| 2021/0365219 A1* | 11/2021 | Hidaka | G06F 3/1208 |

* cited by examiner

FIG. 6
PVS DETECTION LOG — 600

| ZONE | SEED LOCATION | DETECTED? |
|---|---|---|
| 1 | (3.2, 1.1) | YES |
| 1 | (3.1, 1.2) | YES |
| 1 | (2.7, 1.6) | NO |
| 1 | (3.5, 1.1) | YES |

PRINT DEFECT SEEDING WITHIN SELECTED ZONES FOR PRINT VERIFICATION SYSTEM

TECHNICAL FIELD

The following disclosure relates to the field of printing, and in particular, to inspection of printed jobs.

BACKGROUND

Entities with substantial printing demands typically use a production printer. A production printer is a high-speed printer used for volume printing, such as a continuous-forms printer that prints on a web of print media stored on a large roll. A production printer typically includes a localized print controller that manages the overall operation of the printer, and a marking engine (sometimes referred to as an "imaging engine" or a "print engine"). The marking engine includes one or more arrays of printheads.

Upon receiving a print job, the print controller rasterizes logical pages of the job (e.g., to create bitmaps representing each page of the job), and the marking engine operates individual printheads to mark the web based on the rasterized logical pages. Thus, the printer marks physical pages based on the digital information of the print job.

Print jobs that have been completed by a printer are often verified by comparing their printed output to images stored in memory. If defects are detected, such differences between anticipated and actual output can be reported. However, warping of the pages of a physical print job caused by the introduction of moisture (e.g., via ink) or the removal of moisture (e.g., via a dryer) may increase the difficulty of finding defects. For example, it may be particularly difficult to detect the presence of defects at locations where local warping is non-uniform.

Thus, those of skill in the art continue to seek out new systems and techniques for enhancing print verification systems and processes.

SUMMARY

Embodiments described herein provide for enhanced Print Verification Systems (PVSs) and techniques that are capable of automatically seeding a print job with print defects for detection, and doing so on a randomized basis across an entirety of each page of the print job. The number and arrangement of defects may be determined based on the number of copies of the print job to be printed. Specifically, each page of the print job is sub-divided into a number of zones equal to a number of copies of the print job. A defect is then added to each page of each copy of the print job, within the zone defined for that copy. This technique allows for randomized seeding of defects, while also beneficially ensuring an even spread of discrepancies across the pages and copies of the print job. This in turn enables the generation of test print jobs which help to verify that a PVS is capable of detecting defects that may occur at a print job.

One embodiment is a system that includes a print server. The print server includes an interface that receives a test print job, a memory that stores the test print job, and a print controller that determines a number of copies of the test print job to print, subdivides each sheetside image of the test print job into a number of distinct zones corresponding to the number of copies, assigns each of the zones to a different copy of the test print job, and for each copy of the test print job, and seeds a print defect into each sheetside image of the copy within a zone assigned to the copy.

A further embodiment is a method. The method includes storing a test print job in a memory of a print server, determining a number of copies of the test print job to print, subdividing each sheetside image of the test print job into a number of distinct zones corresponding to the number of copies, assigning each of the zones to a different copy of the test print job, and for each copy of the test print job, seeding a print defect into each sheetside image of the copy within a zone assigned to the copy.

A further embodiment is a non-transitory computer readable medium embodying programmed instructions which, when executed by a processor, are operable for performing a method. The method includes storing a test print job in a memory of a print server, determining a number of copies of the test print job to print, subdividing each sheetside image of the test print job into a number of distinct zones corresponding to the number of copies, assigning each of the zones to a different copy of the test print job, and for each copy of the test print job, seeding a print defect into each sheetside image of the copy within a zone assigned to the copy.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

FIG. 6 is a table depicting seed locations for print defects in an illustrative embodiment.

DETAILED DESCRIPTION

The figures and the following description illustrate specific illustrative embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
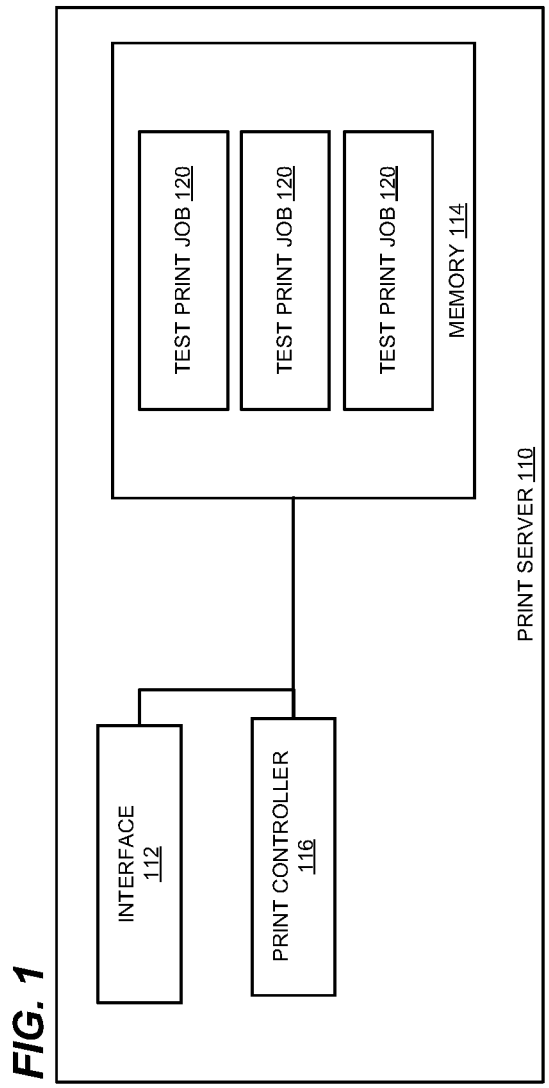
FIG. 1 is a block diagram of a print server in an illustrative embodiment.

FIG. 1 is a block diagram of a print server in 110 an illustrative embodiment. Print server 110 comprises any system, device, or component operable to process incoming print jobs for printing at a print shop. In this embodiment, the print server 110 has been enhanced to seed the pages of one or more test print jobs 120 with print defects for detection by a PVS. For example, a print controller 116 of print server 110 may insert a print defect by adding additional marks to, or deleting marks from, sheetside images of a test print job 120.

As used herein, a "test print job" comprises print data awaiting seeding with print defects. A test print job 120 may correspond with print data within a print job that is about to be printed in a production run (e.g., a book). That is, in one embodiment, print data for the test print job 120, prior to seeding with print defects, matches the content of a print job for distribution. In a further embodiment, a test print job 120 comprises "dummy" print data arranged in a similar manner to that of a print job that is about to be printed. By seeding a test print job 120 with defects and inspecting the test print job 120 with a PVS, a technician can rapidly determine whether the PVS is capable of detecting unintended print defects during a production run.

Print server 110 seeds/inserts print defects into different zones of the page for different copies of the test print job. This provides a technical benefit by ensuring that, in aggregate, inserted defects are distributed evenly across the pages of the test print jobs 120. This means that a PVS can be checked for accuracy across all zones of each page. It also means that the larger number of copies of test print job 120 that are printed, the more thoroughly print defects may be inserted throughout it, and hence the more thoroughly the operations of a PVS may be verified.

In this embodiment, print server 110 includes an interface 112, such as an Ethernet or wireless interface for receiving data via a network. Test print jobs 120 received via the interface 112 are stored in memory 114 and managed by print controller 116. Print controller 116 may be implemented as custom circuitry, as a hardware processor executing programmed instructions, etc.

In this embodiment, test print jobs 120 comprise rasterized print data (e.g., bitmaps), Page Description Language (PDL) data (e.g., Portable Document Format (PDF) data), or other content accompanied by a job ticket (e.g., a Job Definition Format (JDF) job ticket). Print controller 116 is configured to alter print data for a test print job 120 in order to seed individual copies of the test print job 120 with print defects at different locations on the page.

The particular arrangement, number, and configuration of components described herein is illustrative and non-limiting. Illustrative details of the operation of print server 110 will be discussed with regard to FIG. 2. Assume, for this embodiment, that print server 110 has received print data for a test print job 120.

Figure 2:
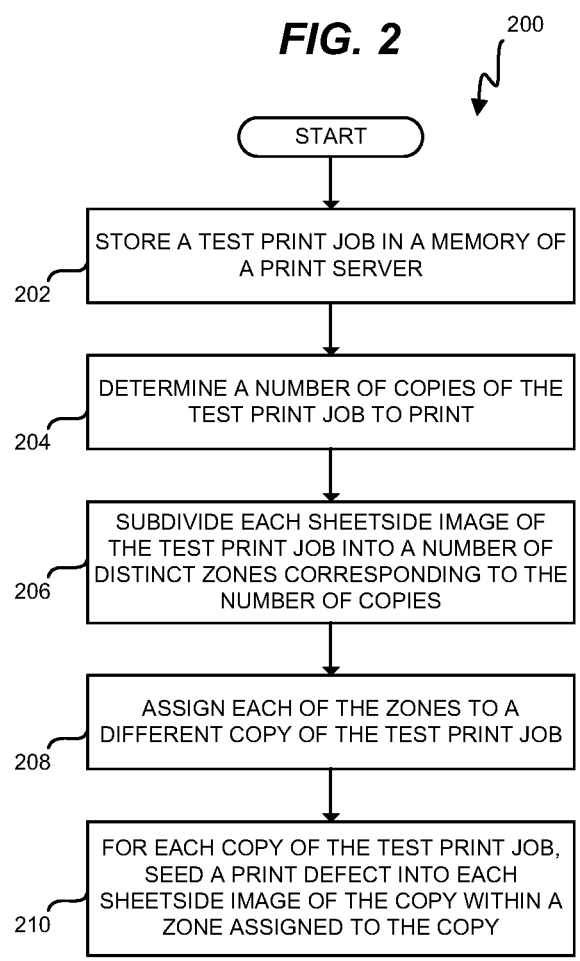
FIG. 2 is a flowchart illustrating a method for operating a print server to insert print defects into a print job in an illustrative embodiment.

FIG. 2 is a flowchart illustrating a method 200 for operating a print server 110 to insert print defects into a test print job 120 in an illustrative embodiment. The steps of method 200 are described with reference to print server 110 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, the print controller 116 stores the test print job 120 in memory 114. Storing the test print job 120 in memory 114 may comprise storing PDL print data or rasterized print data in the memory 114 for later transmission to one or more printers for printing.

In step 204, the print controller 116 determines a number of copies of the test print job 120 to print. Determining the number of copies may comprise consulting a job ticket for the test print job 120 to identify the number of copies, reviewing a predetermined setting in memory 114 for the test print job 120, querying a technician at the print shop for a number of copies, etc.

In step 206, the print controller 116 subdivides each sheetside image of the test print job 120 into a number of distinct zones corresponding to the number of copies. Distinct zones are zones that do not overlap each other and/or that share borders with neighboring zones.

Subdividing the sheetside image may comprise dynamically choosing a zone size based on the number of copies, such that the zones each occupy an equal area of the sheetside image. For example, if the number of copies is even, the print controller 116 may subdivide the page into two columns (or another even number of columns) of equal size. If the number of copies is odd, then print controller 116 may subdivide the page into three columns (or another odd number of columns) of equal size. The columns are then subdivided into zones equal to the number of copies, each zone having a same size (e.g., width and height on the sheetside image). In this manner, the zones in aggregate may cover an entirety of the sheetside image.

In further embodiments, any suitable strategy for subdividing the zones may be utilized. For example, zones may be defined as regions within a predetermined distance from selected locations on the sheetside image. This results in circular zones.

In step 208, the print controller 116 assigns each of the zones to a different copy of the test print job 120. In this embodiment, each zone is a dedicated range of locations at a sheetside image for receiving a print defect, and is associated with a specific copy of the test print job 120. Thus, different copies of the test print job 120 are seeded with defects in different zones. For example, a first copy of the test print job 120 may be assigned for receiving defects in a first zone, a second copy of the test print job 120 may be assigned for receiving defects in a second zone, and so on. In this embodiment, each zone is assigned to a single copy, and each copy is assigned to a single zone. That is, there is a one-to-one correspondence between zones and copies.

In step 210, for each copy of the test print job 120, the print controller 116 seeds a print defect into each sheetside image of the copy, within a zone assigned to the copy. In one embodiment, for each page of each copy of the test print job, the print controller is configured to randomly/stochastically select a location within the assigned zone to insert a print defect. A print defect comprises a collection of pixels (e.g., ten to fifteen contiguous pixels, or more or less), that are not indicated in print data for the test print job 120. Alternatively, a print defect comprises the absence of a collection of pixels indicated in print data for the test print job 120.

In a further embodiment, the nature of print defect inserted depends on a color of the print job at the selected location (e.g., within a region extending for ten pixels in each direction around the selected location). For example, the print controller 116 may be configured to select a color for a print defect, based on whether a location for the print defect is within a region of black, non-black, or white at the test print job 120. That is, the print defect may be colored white within a region that is primarily black, and be colored black within a region that is primarily white. The print defect may be selectively colored as white or black based on the average darkness of a non-black region. That is, if the average darkness is more than fifty percent black, the print defect is colored white, while if the average darkness is less than fifty percent black, the print defect is colored black.

With a location and color for a print defect having been chosen, print controller 116 proceeds to alter print data for the test print job 120 to insert the print defect. In one embodiment, this comprises altering a rasterized version of the test print job 120, or altering PDL print data of the test print job 120 in order to apply the print defect to the test print job 120. In a further embodiment, this comprises altering the contents of a "golden" master digital copy for the test print job 120 stored in memory 114, and used by a PVS for comparison against the test print job 120.

In a further embodiment, the print controller 116 is configured to maintain historical data (e.g., a table) in memory 114 indicating locations at each sheetside image where seeded print defects were inserted. By maintaining information indicating where each print defect was inserted, print server 110 helps a technician to rapidly confirm that each print defect inserted into the test print job 120 has been detected by a PVS.

After the print defects have been seeded into the copies of the test print job 120, the copies of the test print job 120 are sent to a printer for printing (e.g., onto a web of print media). The printed copies advance from the printer and into view of an image capture device (e.g., camera) of a PVS for review. The PVS is then operated to detect the print defects that were seeded, by comparing a golden master copy stored in memory to the copy of the test print job 120 being reviewed. If the PVS fails to detect the seeded defects, then print server 110 may provide a notification to a technician indicating a need to recalibrate or otherwise service the PVS.

Method 200 provides a technical benefit over prior techniques, because it ensures that print defects may be seeded randomly across the page, while still being distributed evenly across the page. That is, print defects are guaranteed to be placed at different zones of a page for different copies of the test print job 120. This is valuable because ink quantity and amounts of warping may be different in some zones than in other zones. This ensures that a PVS can be tested to confirm that it is capable of detecting print defects at any of various locations along each page of a test print job 120.

Figure 3:
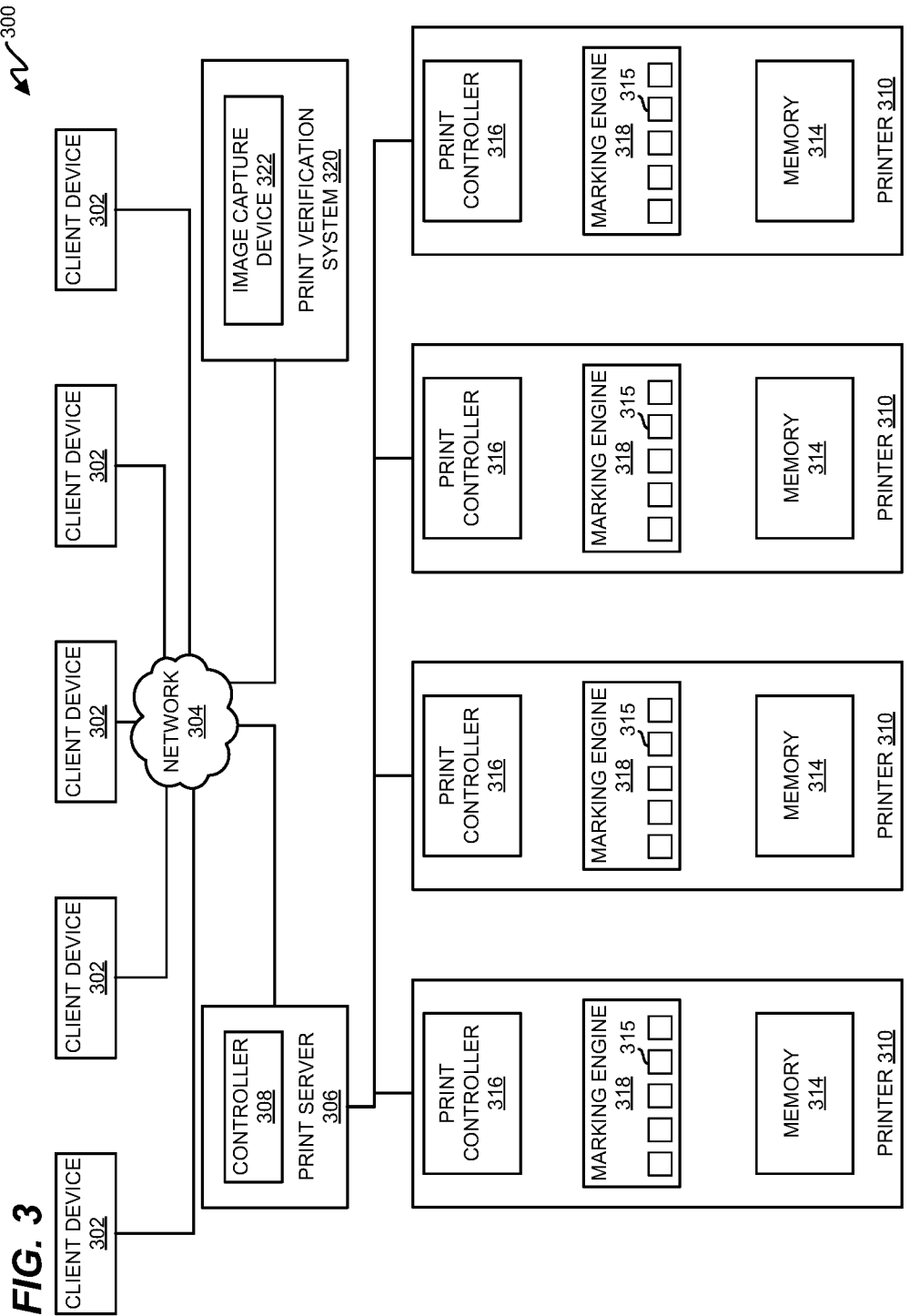
FIG. 3 is a block diagram depicting a print shop in an illustrative embodiment.

FIG. 3 is a block diagram depicting a print shop 300 in an illustrative embodiment. In this embodiment, multiple client devices 302 provide print jobs, comprising PDL print data accompanied by a JDF job ticket, to a print server 306 via a network 304 (e.g., the Internet). A controller 308 of the print server 306 distributes the print jobs across one or more printers 310.

Printers 310 comprise any systems, devices, or components operable to mark print media (e.g., paper, card stock, paper board, corrugated fiberboard, film, plastic, synthetic, textile, glass, composite or any other tangible medium suitable for printing) in accordance with received instructions in print data for a print job. In this embodiment, each printer 310 comprises a continuous-forms printer that marks a web of print media which travels through the printer 310 in a web direction (also referred to as a "process direction"). Specifically, each printer 310 includes a print controller 316 that directs the operations of one or more marking engines 318, which each comprise one or more arrays of printheads 315. The printheads 315 operate nozzles to eject ink or other marking materials onto the print media in accordance with instructions from the print controller 116 as the print media advances. In further embodiments, each printer 310 comprises a cut-sheet printer that marks sheets or strips of print media.

Print data received at a printer 310 may be stored in memory 314 as PDL data, or may be rasterized by the print controller 316 and then stored in a rasterized format (e.g., as one or more bitmaps). Rasterized print data is ready for immediate handling by a marking engine 318 of the printer, while PDL print data must be rasterized before use.

The print shop 300 also includes a PVS 320. PVS 320 comprises any device capable of imaging and/or reviewing the printed output of a printer 310. In this embodiment, PVS 320 is distinct from each printer 310 (e.g., coupled with a web of print media at a location that is downstream of a printer with respect to a web direction along which the web proceeds). PVS 320 may include an image capture device 322. An image capture device 322 comprises any suitable device for acquiring optical content (e.g., an optical scanner, camera, densitometer, etc.), and captures (e.g., acquires) images of the print media after printing. For example, an image capture device 322 may periodically acquire images of the print media via a single camera or an array of cameras. In embodiments where an array of cameras is used, an image capture device 322 may stitch images from cameras in the array together, in order to generate a composite image that extends across a width of the print media (i.e., a direction perpendicular to a process direction of the web of print media).

Figure 4:
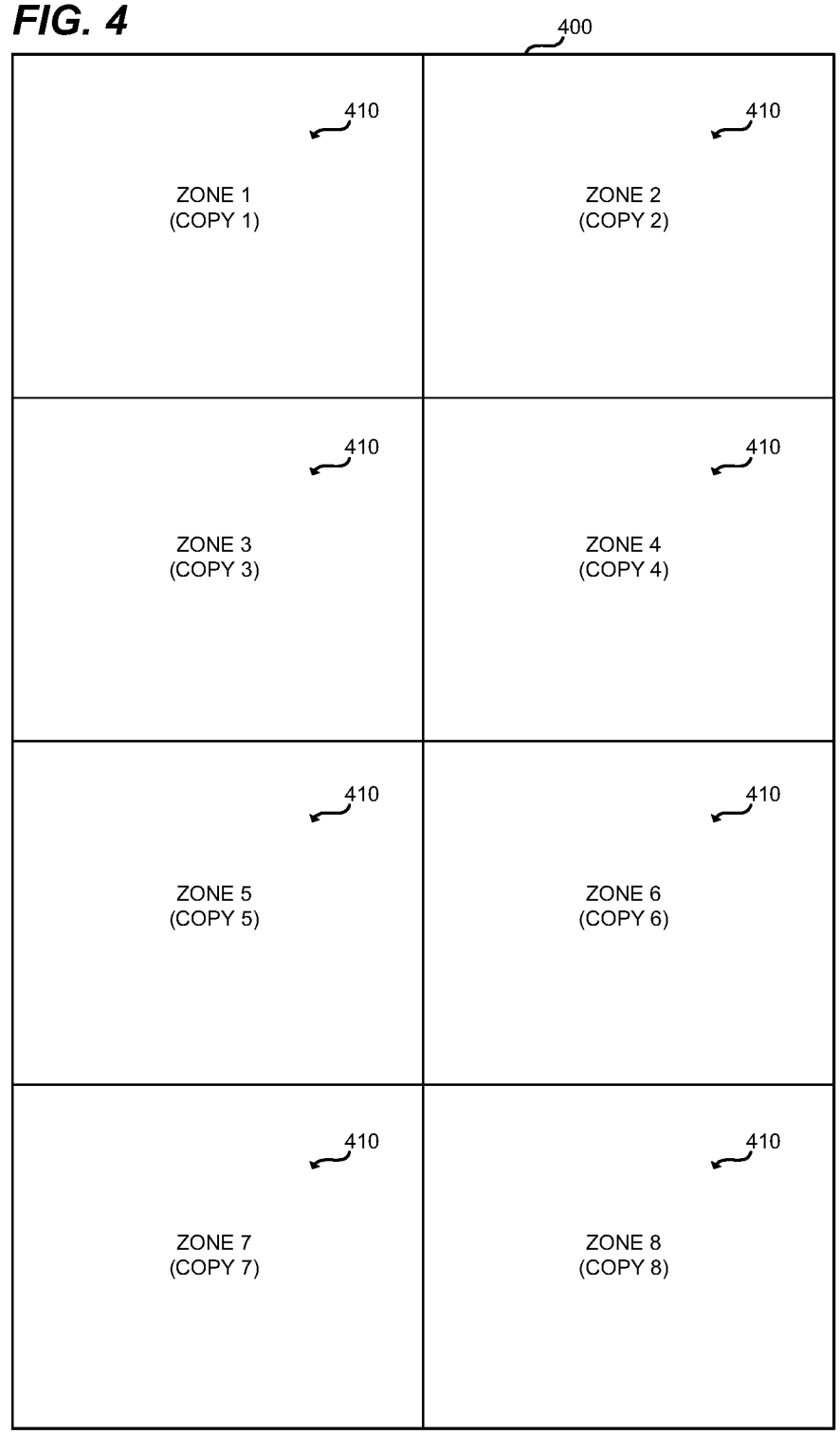
FIG. 4 depicts a page of a print job that has been subdivided into zones in an illustrative embodiment.

FIG. 4 depicts a page of a print job that has been subdivided into zones in an illustrative embodiment. Specifically, FIG. 4 depicts a sheetside image 400 which has been subdivided into eight separate zones 410, each of which occupies a distinct portion of the sheetside image. In this embodiment, each zone is reserved for a specific copy of a test print job 120. That is, print defects are exclusively inserted into zone 1 for each page of the first copy of the test print job 120, zone 2 for each page of the second copy of the test print job 120, etc. In one embodiment, the algorithm used to subdivide the sheetside image 400 into zones attempts to ensure that zones 410 each have the same size and/or dimensions, while also being as close to square as possible. That is, zones which comprise narrow strips across the entirety of the sheetside image 400 may be avoided or prevented, in order to ensure that stochastically applied print defects for different copies are less likely to be clustered together.

Figure 5:
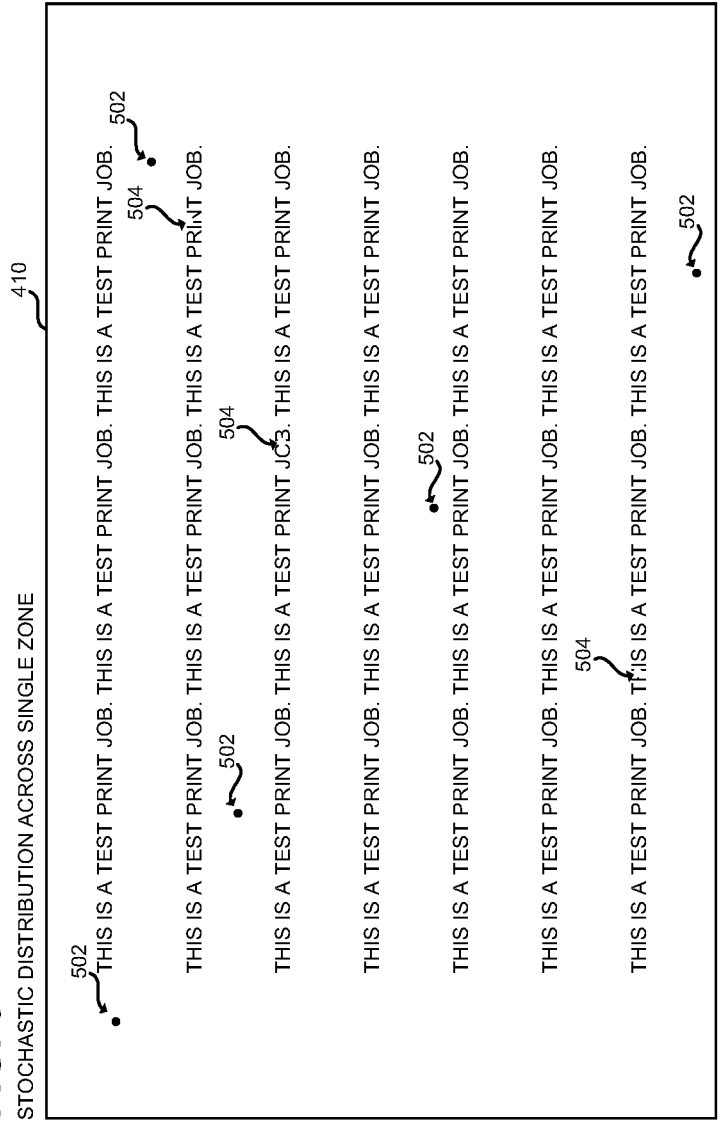
FIG. 5 depicts print defects randomly distributed across a single zone in an illustrative embodiment.

FIG. 5 depicts print defects randomly distributed across a single zone in an illustrative embodiment. In this embodiment, multiple print defects are placed into the zone 410. However in further embodiments, only a single print defect is inserted into each zone 410 per page. In this embodiment, the print defects include additive print defects 502, wherein additional ink is applied to the page, as well as subtractive print defects 504, wherein ink that would otherwise have been applied to the page has been removed.

FIG. 6 is a table 600 depicting seed locations for print defects in an illustrative embodiment. Table 600 may be utilized to track the locations/positions at which each print defect was seeded by a print server. In this embodiment, print controller 116 is also configured to use table 600 as historical data in memory 114, indicating locations at each sheetside image where seeded print defects were not detected by a Print Verification System (PVS). Thus, table 600 allows for rapid manual detection of print defects, as well as rapid detection of print defects that a print verification system has failed to discover.

EXAMPLES

In the following examples, additional processes, systems, and methods are described. The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Figure 7:
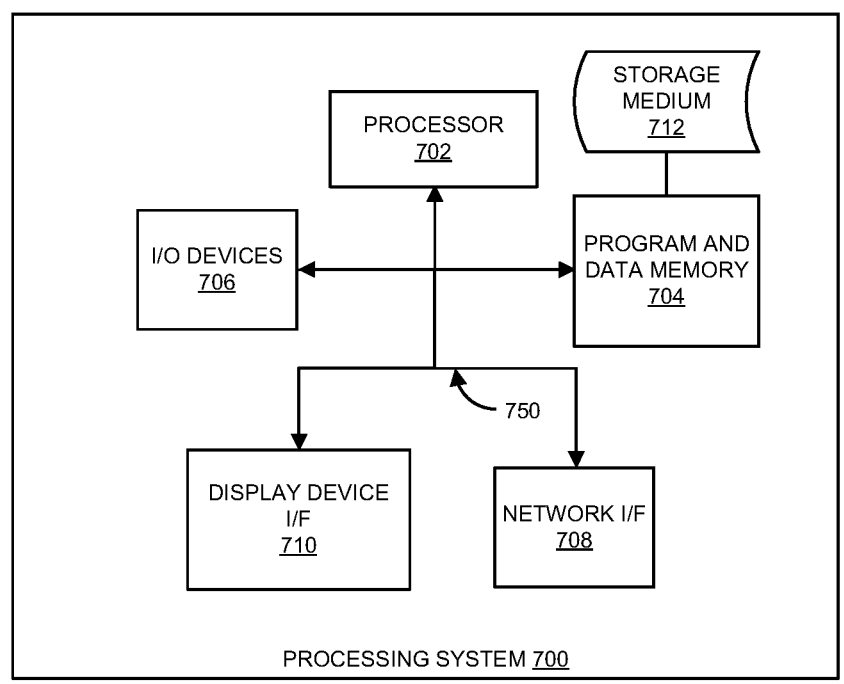
FIG. 7 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of print server 110 to perform the various operations disclosed herein. FIG. 7 illustrates a processing system 700 operable to execute a computer readable medium embodying programmed instructions to perform desired functions in an illustrative embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 may be integrated with the system to interface to one or more display devices, such as printing systems and screens for presentation of data generated by processor 702.

Although specific embodiments were described herein, the scope of the invention is not limited to those specific embodiments. The scope of the invention is defined by the following claims and any equivalents thereof.

What is claimed is:

1. A system comprising:
   a print server comprising:
      an interface configured to receive a test print job;
      a memory configured to store the test print job; and
      a print controller configured:
         to determine a number of copies of the test print job to print, wherein the number of copies is greater than one,
         to subdivide each sheetside image of the test print job into a number of distinct zones corresponding to the number of copies, wherein the number of zones equals the number of copies,
         to assign each of the zones of said each sheetside image to a different copy of the test print job, and
         for each copy of the test print job, to seed a print defect into each sheetside image of the copy of the test print job, wherein the print defect in each sheetside image is seeded only within a zone assigned to the copy.

2. The system of claim 1 wherein:
   the print controller is configured to dynamically size the zones based on the number of copies, such that the zones each occupy an equal area of the sheetside image.

3. The system of claim 1 wherein:
   for each page of each copy of the test print job, the print controller is configured to randomly select a location to insert a print defect.

4. The system of claim 1 wherein:
   the print controller is configured to select a color for a print defect, based on whether a location for the print defect is within a region of black, non-black, or white.

5. The system of claim 1 wherein:
   print data for the test print job, prior to seeding with print defects, matches content of a print job for distribution.

6. The system of claim 1, wherein:
   the print controller is configured to seed the print defects stochastically.

7. The system of claim 1 wherein:
   the print controller is configured to maintain historical data indicating locations at each sheetside image where seeded print defects were not detected by a Print Verification System (PVS).

8. A method comprising:
   storing a test print job in a memory of a print server;
   determining a number of copies of the test print job to print, wherein the number of copies is greater than one;
   subdividing each sheetside image of the test print job into a number of distinct zones corresponding to the number of copies, wherein the number of zones equals the number of copies;
   assigning each of the zones of said each sheetside image to a different copy of the test print job; and
   for each copy of the test print job, seeding a print defect into each sheetside image of the copy of the test print job, wherein the print defect in each sheetside image is seeded only within a zone assigned to the copy.

9. The method of claim 8 further comprising:
dynamically sizing the zones based on the number of copies, such that the zones each occupy an equal area of the sheetside image.

10. The method of claim 8 further comprising:
for each page of each copy of the test print job, randomly selecting a location to insert a print defect.

11. The method of claim 8 further comprising:
selecting a color for a print defect, based on whether a location for the print defect is within a region of black, non-black, or white.

12. The method of claim 8 wherein:
print data for the test print job, prior to seeding with print defects, matches content of a print job for distribution.

13. The method of claim 8 further comprising:
seeding the print defects stochastically.

14. The method of claim 8 further comprising:
maintaining historical data indicating locations at each sheetside image where seeded print defects were not detected by a Print Verification System (PVS).

15. A non-transitory computer readable medium embodying programmed instructions which, when executed by a processor, are operable for performing a method comprising:
storing a test print job in a memory of a print server;
determining a number of copies of the test print job to print, wherein the number of copies is greater than one;
subdividing each sheetside image of the test print job into a number of distinct zones corresponding to the number of copies, wherein the number of zones equals the number of copies;
assigning each of the zones of said each sheetside image to a different copy of the test print job; and
for each copy of the test print job, seeding a print defect into each sheetside image of the copy of the test print job, wherein the print defect in each sheetside image is seeded only within a zone assigned to the copy.

16. The non-transitory computer readable medium of claim 15 further comprising instructions for:
dynamically sizing the zones based on the number of copies, such that the zones each occupy an equal area of the sheetside image.

17. The non-transitory computer readable medium of claim 15 further comprising instructions for:
for each page of each copy of the test print job, randomly selecting a location to insert a print defect.

18. The non-transitory computer readable medium of claim 15 further comprising instructions for:
selecting a color for a print defect, based on whether a location for the print defect is within a region of black, non-black, or white.

19. The non-transitory computer readable medium of claim 15 wherein:
print data for the test print job, prior to seeding with print defects, matches content of a print job for distribution.

20. The non-transitory computer readable medium of claim 15 further comprising instructions for:
seeding the print defects stochastically.

* * * * *